(12) United States Patent
Chen et al.

(10) Patent No.: US 7,396,395 B1
(45) Date of Patent: Jul. 8, 2008

(54) COMPOSITION OF A WATER-REPELLENT AGENT

(75) Inventors: Min-Tze Chen, Tainan (TW); Pi-Hsun Chang, Taichung (TW); I-Ling Cheng, Tainan (TW); Wen-Hsin Lin, Taipei Hsien (TW)

(73) Assignee: Everest Textile Co., Ltd., Tainan Hsien (TW)

( * ) Notice: Subject to any disclaimer, the term of this patent is extended or adjusted under 35 U.S.C. 154(b) by 0 days.

(21) Appl. No.: 11/745,594

(22) Filed: May 8, 2007

(51) Int. Cl.
*C09K 3/18* (2006.01)
*C09K 3/00* (2006.01)
*C09D 5/00* (2006.01)

(52) U.S. Cl. .......................... 106/2; 106/271; 252/8.62; 524/174; 524/196

(58) Field of Classification Search ...................... 106/2, 106/271; 252/8.62; 524/174, 196
See application file for complete search history.

(56) References Cited

U.S. PATENT DOCUMENTS

| | | | |
|---|---|---|---|
| 4,576,987 A * | 3/1986 | Crockatt et al. | 524/487 |
| 4,681,910 A * | 7/1987 | Crockatt et al. | 524/487 |
| 5,019,428 A * | 5/1991 | Ludemann et al. | 427/387 |
| 5,200,457 A * | 4/1993 | Vasishth et al. | 524/437 |
| 5,635,279 A * | 6/1997 | Ma et al. | 428/174 |
| 5,869,598 A * | 2/1999 | Yoshida et al. | 528/364 |
| 6,022,918 A * | 2/2000 | Lienert et al. | 524/275 |
| 2006/0151739 A1* | 7/2006 | Sandner et al. | 252/8.61 |

FOREIGN PATENT DOCUMENTS

| | | | |
|---|---|---|---|
| CA | 1276338 A | * | 11/1990 |
| JP | 2-208370 A | * | 8/1990 |

* cited by examiner

*Primary Examiner*—Anthony J. Green
(74) *Attorney, Agent, or Firm*—Apex Juris, pllc; Tracy M Heims

(57) ABSTRACT

A composition of a water-repellent agent has a solvent and a solute. The solvent is water. The solute is dissolved in water and has isocyanate-acryl, non-ionic fluoro-acryl, 4,4-dipheylmethane diisocyanate, zinc acetate and polyethylene wax. Isocyanate-acryl has a concentration in a range of 10~40 gram in per liter of the water-repellent agent (i.e. 10~40%). Non-ionic fluoroacryl has a concentration in a range of 80~150% t. 4,4-dipheylmethane diisocyanate has a concentration in a range of 5~12%. Zinc acetate has a concentration in a range of 1~20%. Polyethylene wax emulsion has a concentration in a range of 1~40%. Therefore, a fabric treated with the present invention has good waterproof ability, widely enhanced color fastness in light and improved tear-resistance strength at the same time.

6 Claims, No Drawings

COMPOSITION OF A WATER-REPELLENT AGENT

BACKGROUND OF THE INVENTION

1. Field of Invention

The present invention relates to a composition of a water-repellent agent, and more particularly to a water-repellent agent used for a fabric made of cationic dyeable polyester (CDPET), which has good waterproof ability and enhanced color fastness in light.

2. Description of the Related Art

Recently, clothes have various colors and designs for user to choose. Thus, a fabric has to be dyed to present different colors. Traditionally, a polyester fabric is dyed with disperse dye. However, the disperse dye in the polyester fabric cannot bear heat, so the polyester fabric has a poor color fastness in light. Now, a cationic dyeable polyester (CDPET) fabric is presented to maintain a dye on the CDPET fabric under sunlight. However, the CDPET fabric with a light color dye will discolor easily. Therefore, some manufacturer will add ultraviolet absorbers into the CDPET fabric when the CDPET fabric is dyed to prolong the life of the dye on the CDPET fabric (i.e. to improve a color fastness in light.)

Additionally, most fabric will proceed with a water repellent finishing improving a waterproof ability and a dirt-resistance. The water repellent finishing will change a surface property of the fabric to allow the fabric to keep water and dirt out of a surface of the fabric. Thus, in one hand, the dirt cannot enter into the fabric, so the dirt on the surface of the fabric can be washed easily. In the other hand, because water also cannot enter easily into the fabric, the fabric can dry rapidly.

In one case, a CDPET fabric is immersed in a dye bath with ultraviolet absorbers first. In turn, the CDPET fabric is immersed in a dye bath with surfactant. Finally, the CDPET fabric is immersed in a water-repellent agent and then the CDPET fabric is treated by padding mangling to obtain a CDPET fabric. The water-repellent agent has a solvent being water and a solute dissolved in water. The solute comprises fluoro-acryl, toluene-2, 4-diisocyanate, 4,4-diphenylmethane diisocyanate, melamine derivatives, magnesium chloride ($MgCl_2$) and DL malic acid, wherein the improvement comprises zinc acetate. Zinc acetate covers the dye on a surface of the fabric to prevent the dye from the sunlight to improve a color fastness in light. However, the CDPET fabric is formed by multiple fibers interweaving, so the CDPET fabric has multiple meshes. Because zinc acetate can not obstruct the intervals, water can enter into the fabric through the meshes. Thus, the CDPET fabric has poor waterproof ability.

In another case, the CDPET fabric further has isocyanate-acryl. The isocyanate-acryl obstructs the meshes of the CDPET fabric to improve the waterproof ability. However, isocyanate-acryl will refract the sunlight, so the sunlight will pass through the isocyanate-acryl. Therefore, the color fastness in light of the CDPET fabric will be decreased.

In brief, no excellent color fastness in light and waterproof ability usually exists in the CDPET fabric at the same time.

To overcome the shortcomings, the present invention provides a composition of a water-repellent agent to mitigate or obviate the aforementioned.

SUMMARY OF THE INVENTION

The primary objective of the present invention is to provide a water-repellent agent used for a fabric made of cationic dyeable polyester (CDPET), which has good waterproof ability and enhanced color fastness in light.

To achieve the objective, the composition of a water-repellent agent in accordance with the present invention has a solvent and a solute. The solvent is water. The solute is dissolved in water and has isocyanate-acryl, non-ionic fluoro-acryl, 4,4-diphenylmethane diisocyanate, zinc acetate and polyethylene wax. Isocyanate-acryl has a concentration in a range of 10~40 gram in per liter of the water-repellent agent. Non-ionic fluoro-acryl has a concentration in a range of 80~150 gram in per liter of the water-repellent agent. 4,4-dipheylmethane diisocyanate has a concentration in a range of 5~12 gram in per liter of the water-repellent agent. Zinc acetate has a concentration in a range of 1~20 gram in per liter of the water-repellent agent. Polyethylene wax emulsion has a concentration in a range of 1~40 gram in per liter of the water-repellent agent. Therefore, the fabric treated with the present invention has good waterproof ability, widely enhanced color fastness in light and improved tear-resistance strength at the same time.

Other objectives, advantages and novel features of the invention will become more apparent from the following detailed description when taken in conjunction with the accompanying tables.

DETAILED DESCRIPTION OF THE INVENTION

A composition of a water-repellent agent in accordance with the present invention has a solvent and a solute.

The solvent is water.

The solute is dissolved in water and has isocyanate-acryl, non-ionic fluoro-acryl, 4,4-diphenylmethane diisocyanate, zinc acetate and polyethylene wax emulsion.

Isocyanate-acryl has a concentration in a range of 10~40 gram in per liter of the water-repellent agent (i.e. 10~40 g/l) and a preferred concentration is 20 g/l.

Non-ionic fluoro-acryl has a concentration in a range of 80~150 gram in per liter of the water-repellent agent (i.e. 80~150 g/l) and a preferred concentration is 100 g/l.

4,4-diphenylmethane diisocyanate has a concentration in a range of 5~12 gram in per liter of the water-repellent agent (i.e. 5~12 g/l) and a preferred concentration is 10 g/l.

Zinc acetate has a concentration in a range of 1~20 gram in per liter of the water-repellent agent (i.e. 1~20 g/l) and a preferred concentration is 5 g/l.

Polyethylene wax emulsion has a concentration in a range of 1~40 gram in per liter of the water-repellent agent (i.e. 1~40 g/l) and a preferred concentration is 5 g/l.

EXAMPLE

A. An embodiment of proceeding waterproof finishing is illustrated below to exemplify using the water-repellent agent of the present invention. The waterproof finishing comprises following four steps.

1. Preparing step: A cationic dye is added in a bath to form a dye bath. Ultraviolet absorbers are added in the dye bath, wherein the ultraviolet absorbers are thiotriazole with a concentration in a range of 40~60 gram per liter of the dye bath (40~60 g/l) and a preferred concentration is 50 g/l. Then, the dye bath is heated to 120° C. and cationic dyeable polyester (CDPET) fabric is immersed in the heated dye bath for 30 minutes.

2. Pre-treatment: A surfactant such as sunresist NR (100 liter) is added in another dye bath and the dye bath is heated to 80° C. The surfactant is dissolved in the dye bath and has a concentration in a range of 1.8 wt %~2.5 wt %. Said CDPET fabric is immersed in the dye bath for 20 minutes to enhance a waterproof ability after proceeding a waterproof treatment described below.

3. Waterproof treatment: The CDPET fabric is treated with the water-repellent agent by padding mangling. Conditions of the padding mangling are shown in table 1.

TABLE 1

| Item | | a preferred range | most preferred value |
|---|---|---|---|
| Pressure | | 2~3 Kg/cm$^2$ | 2 Kg/cm$^2$ |
| Condition of dry to cure | Pre-cure | 110~120° C./ 90~120 second | 100° C./90 second |
| | cure | 155~165° C./ 180~200 second | 160° C./180 second |

4. Calendering treatment: The CDPET fabric is treated by calendering at 160° C. with a pressure of 58 kg/cm$^2$ to obtain a CDPET fabric with good waterproof ability and a enhanced color fastness in light.

B. Tests for the CDPET fabric after proceeding waterproof finishing.

The tests comprises measuring water-pressure resistance, color fastness in light and tear-resistance strength of CDPET fabrics without proceeding waterproof finishing and with proceeding waterproof finishing by a conventional water-repellent agent and the water-repellent agent of the present invention. The CDPET fabric is under the sunlight for twenty hours before testing its color fastness in light.

The conventional water-repellent agent comprises a solvent being water and a solute dissolved in water. The solute has a fluoro-acryl at 50~100 g/l, toluene-2, 4-diisocyanate at 6~12 g/l, 4,4-diphenylmethane diisocyanate at 3~6 g/l, melamine derivatives at 0.7~1.5 g/l, magnesium chloride (MgCl$_2$) at 0.25~0.3 g/l, DL malic acid at 0.5~1.5 g/l and zinc acetate at 1~20 g/l.

Results of the tests are shown in Table 2.

TABLE 2

| | Un-treating | conventional | | Present invention | |
|---|---|---|---|---|---|
| Water-pressure resistance | | | | | |
| HL = 0 | — | 1170 | | 1120 | |
| HL = 25 | — | 690 | | 680 | |
| color fastness in light | | | | | |
| HL = 0 | 2 | 2 – 3~3 | | 3~3 – 4 | |
| HL = 25 | 2 | 2 – 3~3 | | 3~3 – 4 | |
| Tear strength | | | | | |
| HL = 0 | warp woof | warp | woof | warp | woof |
| | ≧1500 ≧900 | ≧1500 | ≧900 | ≧2100 | ≧920 |

(HL represents wash frequency of fabric; "—" represents the value is too low to be detected.)

As compared to the CDPET fabric treated with the conventional water-repellent agent, the CDPET fabric treated with the water-repellent agent of the present invention has widely enhanced color fastness in light while the water-pressure resistance slightly decreases. Furthermore, the water-pressure resistance of CDPET fabric with the water-repellent agent of the present invention is much better than that of the CDPET fabric without proceeding waterproof finishing. As such, the CDPET fabric has good waterproof ability and enhanced color fastness in light at the same time.

Furthermore, the tear-resistance strength of the CDPET fabric without proceeding waterproof finishing is similar to that of the CDPET fabric treated with the conventional water-repellent agent. Notably, the CDPET fabric treated with the water-repellent agent of the present invention has improved tear-resistance strength no matter in warp or woof.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A composition of a water-repellent agent comprising:
    a solvent being water;
    a solute dissolved in water and having
        isocyanate-acryl with a concentration in a range of 10~40 grams per liter of the water-repellent agent;
        non-ionic fluoro-acryl with a concentration in a range of 80~150 grams per liter of the water-repellent agent;
        4,4-diphenylmethane diisocyanate with a concentration in a range of 5~12 gram in per liter of the water-repellent agent;
        zinc acetate with a concentration in a range of 1~20 grams per liter of the water-repellent agent;
        polyethylene wax emulsion with a concentration in a range of 1~40 grams per liter of the water-repellent agent.

2. The composition of a water-repellent agent as claimed in claim 1, wherein isocyanate-acryl has a concentration of 20 grams per liter of the water-repellent agent.

3. The composition of a water-repellent agent as claimed in claim 1, wherein non-ionic fluoro-acryl has a concentration of 100 grams per liter of the water-repellent agent.

4. The composition of a water-repellent agent as claimed in claim 1, wherein 4,4-diphenylmethane diisocyanate has a concentration of 10 grams per liter of the water-repellent agent.

5. The composition of a water-repellent agent as claimed in claim 1, wherein zinc acetate has a concentration of 5 grams per liter of the water-repellent agent.

6. The composition of a water-repellent agent as claimed in claim 1, wherein polyethylene wax has a concentration of 5 grams per liter of the water-repellent agent.

* * * * *